(12) United States Patent
Levin et al.

(10) Patent No.: US 7,571,189 B2
(45) Date of Patent: Aug. 4, 2009

(54) METHOD AND APPARATUS TO IMPLEMENT THEMES FOR A HANDHELD DEVICE

(75) Inventors: Bruce Jay Levin, San Jose, CA (US); William G. Swinton, Santa Cruz, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 252 days.

(21) Appl. No.: 11/050,356

(22) Filed: Feb. 2, 2005

(65) Prior Publication Data

US 2006/0173911 A1    Aug. 3, 2006

(51) Int. Cl.
*G06F 7/00* (2006.01)
(52) U.S. Cl. .................. 707/104.1; 715/744; 715/745; 715/746; 715/747
(58) Field of Classification Search ......... 715/744–747; 707/104.1
See application file for complete search history.

(56) References Cited

U.S. PATENT DOCUMENTS

| 6,091,411 | A * | 7/2000 | Straub et al. ................. 715/747 |
| 6,693,652 | B1 * | 2/2004 | Barrus et al. ................. 715/838 |
| 6,909,878 | B2 * | 6/2005 | Haller et al. ................. 455/41.3 |
| 7,024,491 | B1 * | 4/2006 | Hanmann et al. ........... 709/248 |
| 7,099,457 | B2 * | 8/2006 | Weiner ................... 379/373.01 |
| 7,200,388 | B2 * | 4/2007 | Deeds ......................... 455/419 |
| 2002/0087656 | A1 * | 7/2002 | Gargiulo et al. ............. 709/217 |
| 2004/0193639 | A1 * | 9/2004 | Bergman et al. ......... 707/103 R |
| 2005/0055306 | A1 * | 3/2005 | Miller et al. .................. 705/37 |
| 2005/0154991 | A1 * | 7/2005 | Jaeger ......................... 715/769 |
| 2005/0164691 | A1 * | 7/2005 | Payne .......................... 455/419 |
| 2005/0198153 | A1 * | 9/2005 | Keohane et al. ............. 709/206 |
| 2006/0224684 | A1 * | 10/2006 | Miedema et al. ............ 709/207 |
| 2007/0070076 | A1 * | 3/2007 | Foxenland ................... 345/581 |
| 2007/0105541 | A1 * | 5/2007 | Abdesselem et al. ........ 455/419 |
| 2008/0030455 | A1 * | 2/2008 | Foxenland ................... 345/156 |

FOREIGN PATENT DOCUMENTS

WO    WO 2005/025193    *  3/2005

OTHER PUBLICATIONS

"Quick Start Guide: Nokia 3220", 2004, pp. 1-2, Accessed online <http://nds2.nokia.com/files/support/nam/phones/guides/3220_QSG.PDF> (Apr. 17, 2007).*
PCT/US06/03890, International Search Report and Written Opinion mailed Jul. 7, 2008, 10 pages.
Free Themes—Esato archive, 2002, accessed online at <http://esato.com/archive/t.php/t-7766,1.html> on Jun. 17, 2008, pp. 1-6.

* cited by examiner

*Primary Examiner*—Charles Rones
*Assistant Examiner*—Phuong-Thao Cao
(74) *Attorney, Agent, or Firm*—Blakely, Sokoloff, Taylor & Zafman, LLP; Judith A. Szepesi

(57) ABSTRACT

A method and apparatus for the delivery, administration and application of themes to a cellular telephone device. The apparatus, in one embodiment, comprises an inbox to receive a multimedia message (MM) containing a theme, a filing logic to place the MM in a themes folder, a themes folder available to the user to browse the theme MMs, and a client-side application to apply the theme to the user's cellular telephone device. In one embodiment, the apparatus includes notification logic to notify a web page associated with the user to change its display to match the theme applied by the user to the cellular telephone device.

13 Claims, 11 Drawing Sheets

METHOD AND APPARATUS TO IMPLEMENT THEMES FOR A HANDHELD DEVICE

FIELD OF THE INVENTION

The present invention relates to handheld devices such as cellular phones and more particularly to the use of "themes" in such devices.

BACKGROUND

Themes are a packaged set of user interface elements that enable a user experience to be focused around a dominant idea or "motif". For example, a background image, background colors, ring tone, icons, and other features of the cell phone user interface may be unified by a theme. Themes may be focused around popular stars, characters, ideas such as nature, music, etc, or any other unifying motif.

In the prior art, the user could browse themes on a web page. The user could then purchase a theme, either by paying directly on the web page or by having it billed to the user's cell phone account. A notification is sent to the user's cellular phone, which triggers a connection to a web page using WAP (wireless access protocol). A client-side theme application—which executes on the client's device—then applies the theme to the user's handheld device. In one embodiment, the client-side theme application is a heavy-weight application that is used for applying the theme and removing the theme.

SUMMARY OF THE INVENTION

A method and apparatus for the delivery, administration and application of themes to a cellular telephone device. The apparatus, in one embodiment, comprises an inbox to receive a multimedia message (MM) containing a theme, a filing logic to place the MM in a themes folder within the general messaging inbox, a themes folder available to the user to browse the theme MMs, and a client-side application to apply the theme to the user's cellular telephone device. In one embodiment, the apparatus includes notification logic to notify a web page associated with the user to change its display to match the theme applied by the user to the cellular telephone device.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
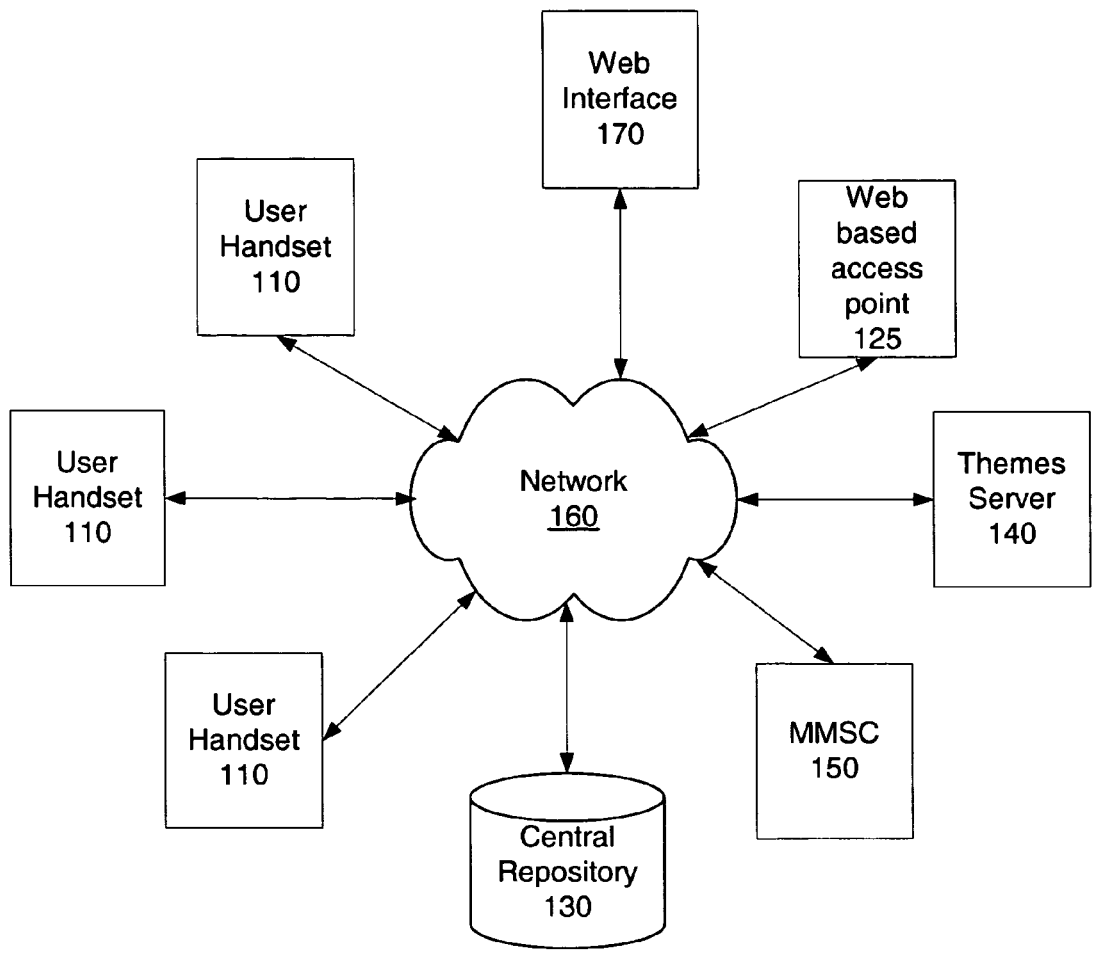
FIG. 1 is a block diagram of the network in which the theme environment may be implemented.

A method and apparatus for the delivery (using Multimedia Messaging Service or "MMS"), administration, and application of themes to a cellular telephone device is described. The system, in one embodiment, includes one or more webpages or other mechanisms that can display themes that may be selected and downloaded to the device. In one embodiment, the system receives the theme destined for the user, packages it up as a multimedia message (MM) and sends it to the user's inbox. The inbox is designed to receive the multimedia message (MM) containing the user selected theme. In one embodiment, the inbox includes a filing logic to place the themes MMs in a separate themes folder. In one embodiment, if no themes folder exists, the filing logic creates the themes folder and files the themes MMs in the themes folder. In one embodiment, the system further includes an expiration logic to remove the theme messages from the theme folder after a preset period of time. If there are no theme messages in the theme folder, in one embodiment the expiration logic also removes the theme folder from the user's system. In one embodiment, expiration logic also can be applied to expire the applied theme itself from the user's device.

In one embodiment, the themes folder is available to the user to browse the theme MMs. In one embodiment, the inbox logic is simply used to scroll through the themes MMs. Thus, in one embodiment, the system uses the same interface mechanism as for normal MMs, for browsing through theme messages. The client device includes a client-side application to apply the theme to the user's cellular telephone device. In one embodiment, the user selects an "open the message" action using the same user interface methodology as opening a standard MM. The client-side themes application is notified, and applies the theme to the user's device. In one embodiment, the system stays in the user's inbox, so that the user may choose to apply a different theme immediately. In one embodiment, when the user applies the theme to the device, the notification logic sends a notification to the server web page associated with the user to change its display to match the theme applied by the user to the cellular telephone device. In an alternative embodiment, the user selects a "keep theme" or similar selection, to indicate that the theme should remain applied to the system, and the notification is sent to the web interface once the "keep theme" selection is made. In this way the user's interface theme experience is seamless between the cellular telephone device and the web interface.

Note that although the terms "handset," "cell phone," "cellular telephone device," and other similar terms are used in this specification, the present invention is not restricted to such devices. Rather, any device capable of receiving a MM, and having a user interface that is capable of being altered to reflect a theme may be used. The alteration of the user interface may include: changing a background image, changing a color scheme, changing the appearance of icons and other graphical elements, changing the tones played by the device, or any other alterations to the user interface. For example, certain personal digital assistants (PDA) are capable of receiving MMs, and having themes applied. Any such device, even devices not capable of making voice telephone calls may be used in the present invention, without departing from the scope of the invention described.

FIG. 1 is a block diagram of the network in which the theme environment may be implemented. The themes server 140 includes one or more themes that may be selected by a user. In one embodiment, the themes server 140 may be accessed through a web based access point 125, such as a desktop computer. In one embodiment, the themes server 140 may be accessed through a user handset 110. In one embodiment, the themes server 140 is maintained by a third party, with no connection to the mobile message service center (MMSC) 150. In another embodiment, the themes server 150 may be on the same system as the MMSC 150. Network 160 couples the elements of the system together. In one embodiment, the network 160 represents multiple different types of networks. For example, network 160 may include. 1) the Service Provider's network from MMSC 150 to the device 110; 2) a LAN/WAN/MAN to connect the server components in operations center(s), where the server components may include Themes Server 140, Central Repository 130, and Web access point 170; and 3) the Internet connection from a user'web access point 125 to the Web Interface 170. The MMSC 150 receives a packaged MM including the theme from the themes server 140. In one embodiment, the theme message is a standard MM1 formatted message. In another embodiment, the theme message is a standard MM7 formatted message. In yet another embodiment, the theme server may send the message in a proprietary format, or any other format that the MMSC 150 can handle. The MMSC 150 formats the message to the appropriate MM1 format prior to sending the multimedia message (MM) to the user's handset.

In one embodiment, the user's handset 110 automatically files the themes MM in the themes folder in the user's inbox. In one embodiment, the user's device creates a themes folder if one does not exist, and files the MM in that folder. In one embodiment, the user's handset includes a standard inbox logic that includes a filing logic, and a thin themes client to apply the theme to the handset.

In one embodiment, the system may further include a central repository 130 to store MM messaging data. In one embodiment, only the header information and a part of MMs are stored on the handset, once the user has viewed a message/theme. In one embodiment, the central repository 130 maintains a full copy of the user's messages—those received as well as those sent.

The system may further include a web interface 170, which enables the user to access the user's messages from the central repository 130. In one embodiment, as will be described below, the system automatically applies a theme to the web interface 170, so that the user views a consistent interface across the device and web with a common theme.

Figure 2:
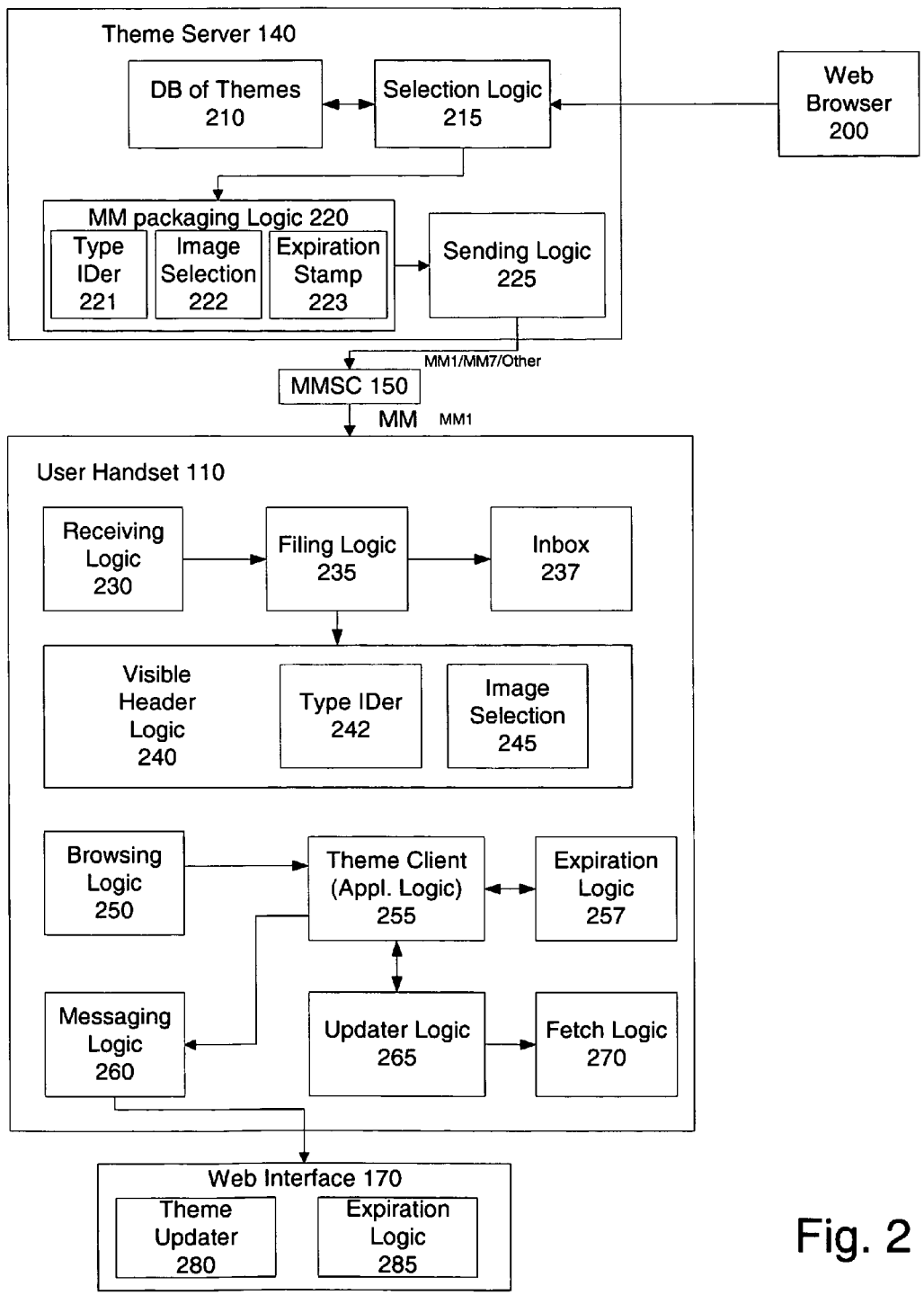
FIG. 2 is a block diagram of one embodiment of the elements which enable themes.

FIG. 2 is a block diagram of one embodiment of the elements which enable themes. The elements include the themes server 140, the MMSC 150, the user's handset 110, and the web interface 170. Note that while the themes server 140, MMSC 150, and web interface 170 are shown as separate elements, they may be implemented on the same server. Furthermore, the functionalities may be distributed in a different way between these elements.

The themes server 140 includes a database (or other storage structure) of themes 210. The selection logic 215 is accessed by a user, in one embodiment through web server 200. The user can browse the themes in the storage 210, and select one or more themes to be sent to his or her cell phone.

Once the user has selected one or more themes to download, an MM packaging logic 220 creates a multimedia message (MM). In one embodiment, the MM includes the theme itself, and certain additional data. For example, in one embodiment, if available, the MM includes header information to be displayed in the inbox folder. The header information may include a theme name/label, the theme type, as well as a representative image associated with the theme. In one embodiment, the MM packaging logic 220 includes a type identifier 221 and image selector 222, to make these determinations. In another embodiment, these determinations are made on the handset. In one embodiment, MM packing logic 220 further includes an expiration stamp 223, to add an expiration date to the theme. In one embodiment, not all themes include an expiration stamp.

Once the message is packaged as an MM, sending logic 225 passes it to MMSC 150. In one embodiment, the theme server 140 acts as a value added service (VAS) and communicates with the MMSC 150 using the MM7 protocol. The MMSC 150 sends the MM, using standard methods, to the user's handset 110. In one embodiment, the MM1 protocol is used.

Figure 6A:
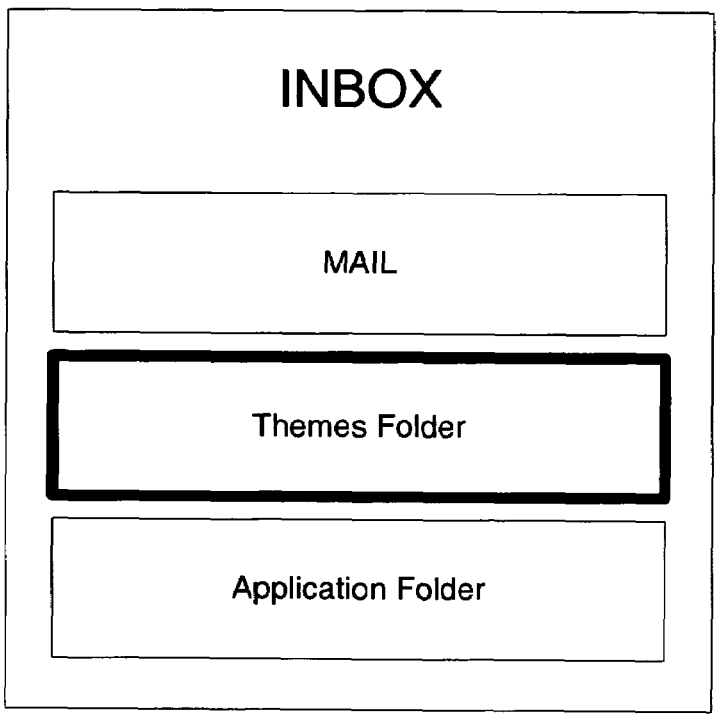
FIGS. 6A-C illustrate an exemplary user interface series for selecting, viewing, and installing a theme.

The user's handset 110 includes receiving logic 230 to receive incoming MMs. Filing logic 235 identifies the MM type. FIG. 6A illustrates an exemplary inbox structure, including folders for separately filing three types of messages. The message types include mail, themes, and applications. Additional types of messages may be included. In one embodiment, "themes" includes subsets of themes such as ring-tones, backgrounds, screen savers, etc. In another embodiment, each of these subsets of user interface personalization may be filed in a separate folder. The filing logic 235 determines where in the inbox 237 the MM should be filed, and places it in the appropriate folder. In one embodiment, the filing logic 235 creates the folder, if it doesn't already exist.

Figure 6B:
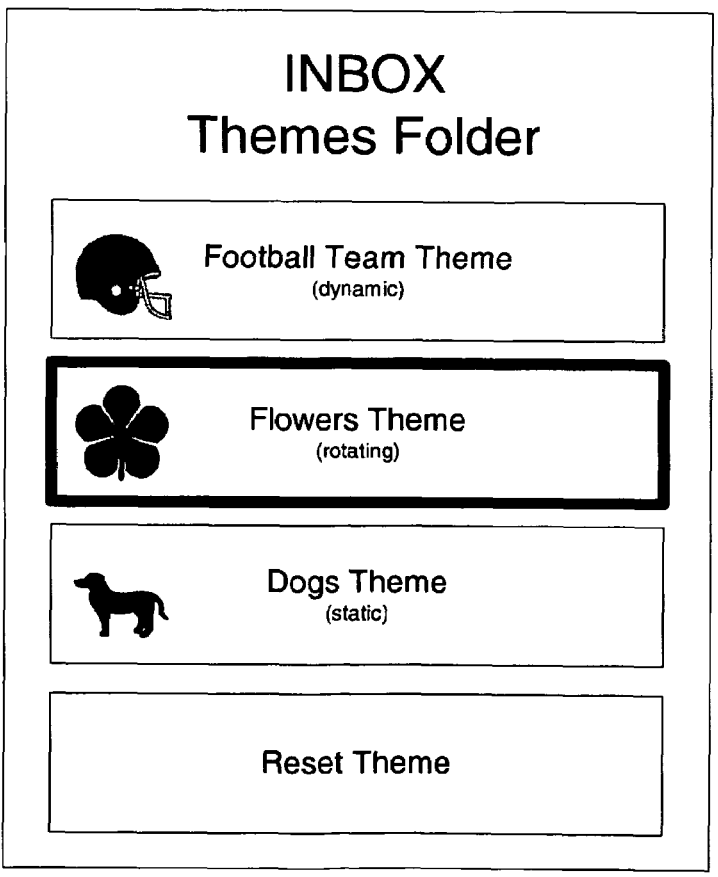

In one embodiment, visible header logic 240 generates the lines of text visibly associated with the message. For example, as shown in FIG. 6B, in one embodiment each theme has associated with it a title/label, and an image. In another embodiment, the representation may be entirely graphical (for example showing a screen shot or the like). In another embodiment, the representation may be only a text message, or any variation of display that can indicate to the user the type of theme. In one embodiment, as discussed above, the visible header logic 240 resides on the theme server 140, and the MM already contains the visible header information.

In one embodiment, the visible header logic 240 includes a type identifier 242. The type identifier 242 determines whether the theme type, including for example static, rotating, and dynamic themes. Static themes are unchanging. Rotating themes change the display among a number of, usually overarching theme-consistent, images. For example, a rotating theme may be "flowers" which show a different set of flowers for each day of the week, but rotates back to the "Monday display" every Monday. Dynamic themes change periodically as well, but are updated with new images for each change. For example, a dynamic theme may be "Your Actress of Choice" which every week shows an updated, and new image of the Actress. In one embodiment, the header information includes the theme type, as identified by the type identifier 242.

In one embodiment, the visible header logic 240 includes an image selector 245. Image selector 245 is used when no representative image is selected for the theme. The image selector 245 identifies a representative image. In one embodiment, the image selected is a background image. In another embodiment, the image selected is the largest image. In another embodiment, the image selected is one of the following: the screensaver image, the background image, the most often repeated image. Alternative methods of selecting the representative image. The visible header logic 240 sets the visible portion of the header, shown in the theme folder in the user's inbox.

Browsing logic 250, in one embodiment is part of the software supporting the inbox. In one embodiment, browsing logic 250 is the same logic used to look through normal MMs. Browsing logic 250 enables a user to navigate and select a theme. In one embodiment, the standard browsing capabilities of the cell phone are used.

If the user clicks on, or otherwise selects, a theme, a theme client 255 is invoked, and the theme client 255 applies the theme to the user's handset. The theme may include one or more of: backgrounds, icons, tones, ring tones, screen savers, and other aspects of the user interface. In one embodiment, a theme is only "applied" or made persistent, if the user selects an "accept/apply" theme option. In an alternative embodiment, the theme is applied/made persistent immediately upon selection. In one embodiment, the user may return to the factory default, i.e. deactivate the current theme. FIG. 6B illustrates an exemplary way in which this may be implemented. The "reset" button shown may be used to deactivate the current theme. In one embodiment, the "reset" button may be used to restore the previously applied theme. In one embodiment, the user may choose whether to return to the previous theme or return to the factory default user interface when using the "reset" button.

In one embodiment, if the theme is a rotating or dynamic theme, updater logic 265 determines when it is time to alter the theme display. In some cases, new data is fetched by fetch logic 270. Updater logic 265 then triggers the theme client 255 to update the theme data on the cell phone.

In one embodiment, when the theme is applied to the handset by the user, message logic 260 sends a notification message to the web interface 170, to apply the corresponding theme. The theme updater 280 in the web interface 170 applies the corresponding theme to the web interface. In one embodiment, the corresponding theme is not identical to the theme applied to the user's handheld device, but rather is a complementary design. For example, the handheld device has a limited memory and display capability. The theme on the web interface 170 may be more elaborate, more frequently updated, or otherwise different. By having a complementary/corresponding theme on the web interface 170, a unified experience is created.

The user handset 110 also includes expiration logic 257. As noted above, themes may include an expiration date. For example, a user may buy a theme for "a month" or another specified period. In one embodiment, themes may also be "persistent" with no expiration dates. The expiration logic 257 removes themes, and theme messages, once they have expired. In one embodiment, the expiration logic 257 also removes the themes folder from the user's inbox, if there are no theme messages remaining in the inbox. In one embodiment, the web interface 170 has includes expiration logic 285, which expires the theme on the web interface at approximately the same time. In one embodiment, the message sent from the handheld device when the theme is applied includes the expiration information. In an alternative embodiment, the handset sends a message to the web interface 170 when the theme is expired on the handset.

Figure 3:
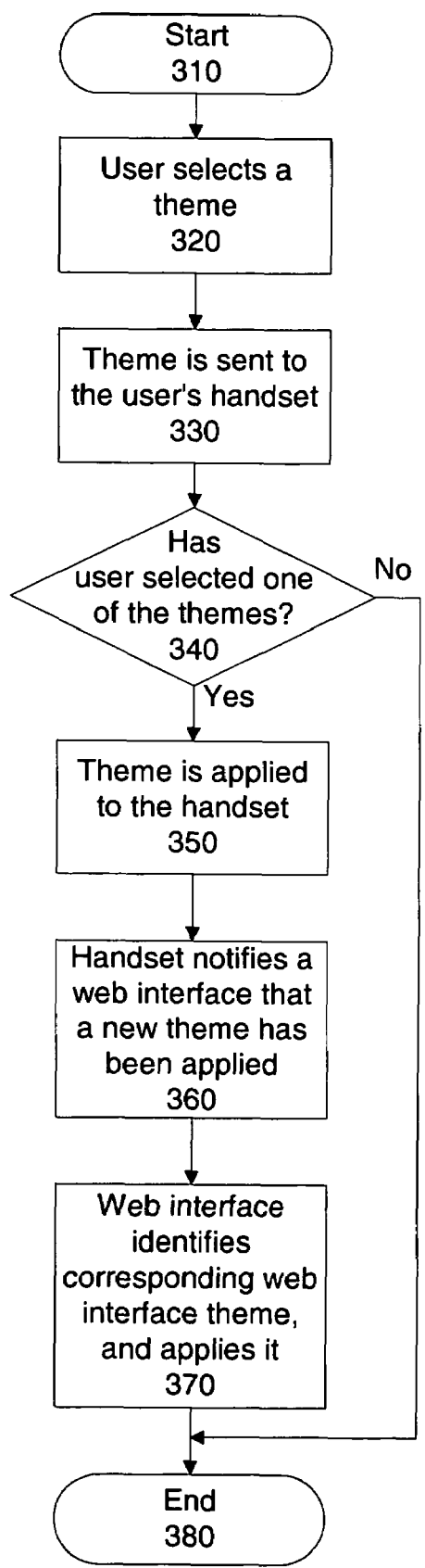
FIG. 3 is a block diagram of the theme loading tool for the handset.

FIG. 3 is an overview flowchart of one embodiment of implementing the themes environment. The process starts at block 310. At block 320, the user selects a theme, to be applied to the user's handheld device.

At block 330, the theme is sent to the user's handset. In one embodiment, the user may select more than one theme.

At block 340, the process determines whether the user has selected one of the themes to be applied to the user's handset. If so, the process continues to block 350. Otherwise, the process terminates.

At block 350, the theme is applied to the handset. Applying the theme includes, in one embodiment, changing various aspects of the user interface, which are specified by the theme. In one embodiment, the user indicates specifically that the theme should be applied.

At block 360, the handset notifies a web interface that a new theme has been applied. In one embodiment, the user specifies that the web interface should have the theme applied as well. In one embodiment, when the user applies the theme to the handset, he or she is given the option to apply it to the web interface or not. For example, in one embodiment, the user interface displays a control window that asks "Would you like to apply this theme?" In one embodiment, that control window includes an option, such as "check this box if you wish to have a complementary theme applied to the web interface." In one embodiment, the default is to apply the theme to the web interface. In one embodiment, the notification includes a theme identifier. In one embodiment, the notification includes the user ID of the handset and a theme ID.

At block 370, the web interface identifies a corresponding web interface theme, and applies the theme to the web interface. In one embodiment, when the user accesses his or her data through the web interface, the user interface with have a theme matching the user's handset theme. This provides a unified experience for the user. Furthermore, since the web interface has certain capabilities that the handset does not, in one embodiment the web interface may provide a more in-depth, interesting, active, or otherwise better version of the user's theme. The process then ends at block 380.

Figure 4A:
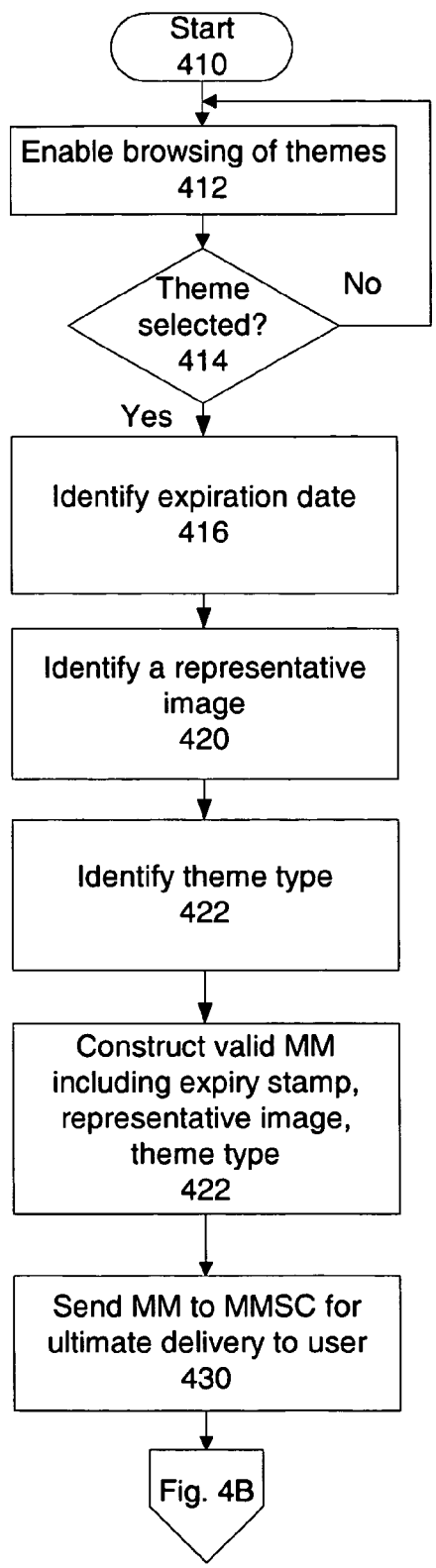
FIG. 4A is a flowchart of one embodiment of sending a theme to a user's device from the server's perspective.

FIG. 4A is a flowchart of one embodiment of downloading the theme, and adding it to the handset from the server's perspective. The process starts at block 410. In one embodiment, the process starts when the user connects to a theme server to browse themes. In one embodiment, the user may do this through his or her handset. In one embodiment, the user may do this through any system that is capable of accessing the Internet, such as a desktop computer system.

At block 412, the browsing of themes is enabled. In one embodiment, themes may be presented in categories, enabling the user to select a category, and then select one or more themes within the category.

At block 414, the process determines whether any themes have been selected. If the user has not selected any themes, the process returns to browsing at block 412. In one embodiment, the system may use the "shopping cart" analogy, and permit the user to add one or more themes to the shopping cart. The theme is "selected" when the user clicks on the "accept" or "purchase" option. In one embodiment, the system automatically bills the user for these themes. In another embodiment, the user is not billed for a theme until the user installs the theme on the handset. In another embodiment, the user is not billed for a theme until the user has had the theme on the handset for a preset period of time; i.e. a "preview" period. This would enable the user to see how the theme actually looks/sounds on his or her handset, prior to being charged for the theme. If the user wishes to download the themes, the process continues to block 416.

At block 416, in one embodiment, an expiry date stamp is added to the theme message. The expiry date stamp indicates when the MM message, and/or the associated theme expires. The lifetime of a theme/message can be hours, days, weeks, or indefinite.

At block 420, the "representative image" is identified, selected, or created. In one embodiment, the representative image is a thumbnail image. In another embodiment, one or more images from the theme are selected as representative. For example, for a football theme, the representative image may be a football helmet including the logo of the team. The representative image is selected to enable the user to visually identify the main motif of the theme.

At block 422, the theme type is identified. Exemplary theme types include: static, rotating, and dynamic. These theme types are described in more detail above.

At block 424, process constructs a valid MM, including the theme, as well as the representative image, theme type, and expiry information. In one embodiment, this information is included in the message header, or as part of the content of the MM. In an alternative embodiment, the theme server may package the theme information in a proprietary (i.e. neither MM7 nor MM1) format. The process then continues to block 430.

At block 430, the MM is sent to the MMSC for ultimate delivery to the user's device. In one embodiment, the user provides a cellular telephone number or other unique identifier when he or she selects the themes to be downloaded. In one embodiment, if the theme server creates a proper MM message (in one embodiment MM1 format), the MMSC simply forwards the message to the user's device. In one embodiment, the MMSC determines whether the message is in the proper format, and if it is not, the MMSC reformats the message to the proper MM format, prior to forwarding it to the user.

Figure 4B:
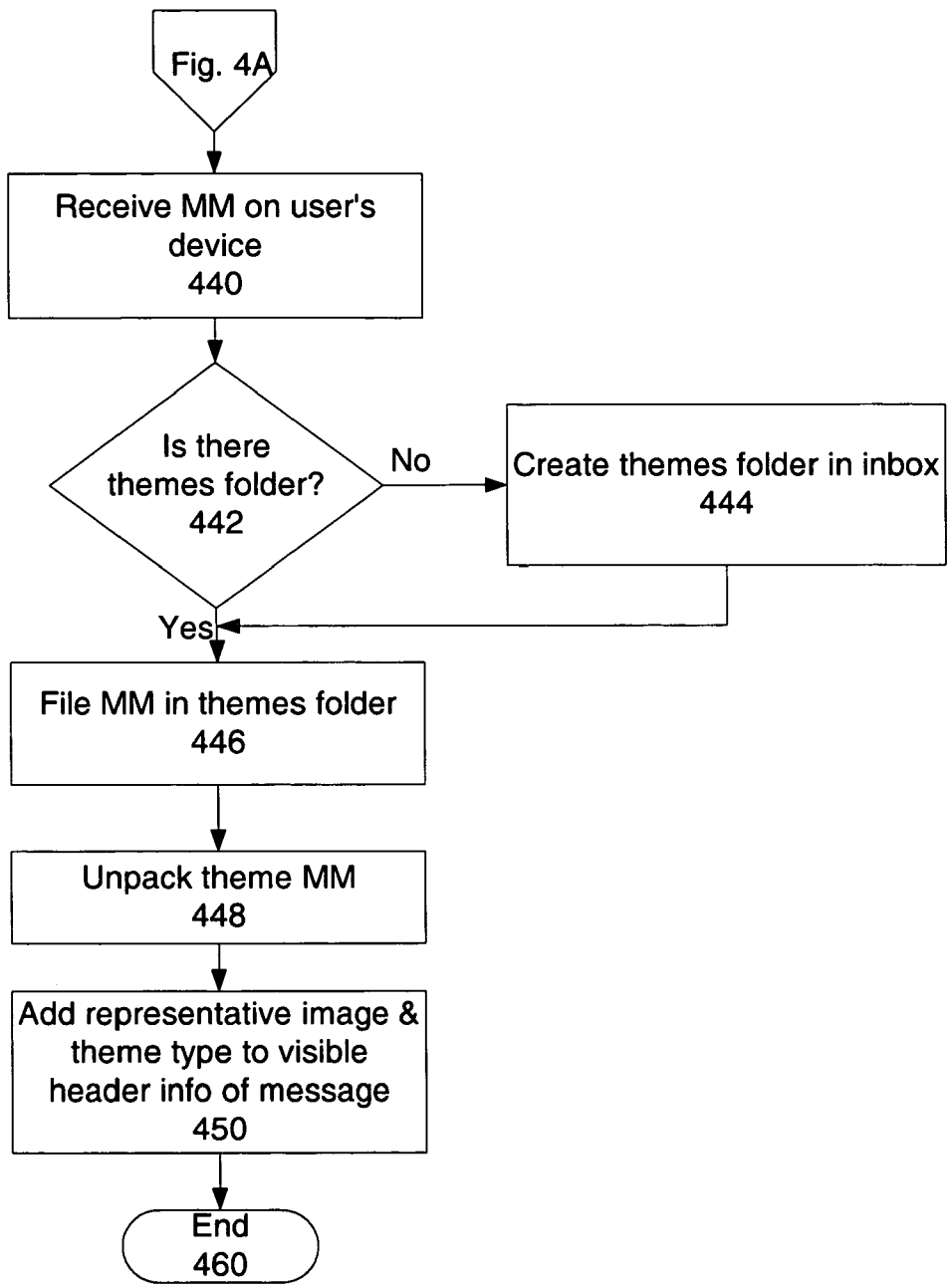
FIG. 4B is a flowchart of one embodiment of receiving a theme at the user's device from the client's perspective.

FIG. 4B is a flowchart of handling the theme message from the client's perspective. At block 440, the MM is received by the user's system.

At block 442, the process determines whether the user's inbox already has a themes folder. If there is no themes folder, at block 444, the system creates a themes folder. The process then continues to block 446. If there is a themes folder already, the process continues directly to block 446.

At block 446, the message is filed in the themes folder in the user's inbox. In one embodiment, each theme is separately presented as a "message" which may be browsed by the user.

At block 448, the process unpacks the theme message to create the visible header. The visible header, in one embodiment, includes one or more of: the theme title, representative image, theme type, and expiry date. In one embodiment, if these elements are missing, the themes client may attempt to create them (i.e. generate a thumbnail image from the theme for the representative image, and identify the theme type.)

At block 450, the representative image and theme type are added to the visible header information (in addition to theme title/label), so that when the user browses the available themes in the theme folder, each theme is easily identified. The process then ends at block 460.

Figure 4C:
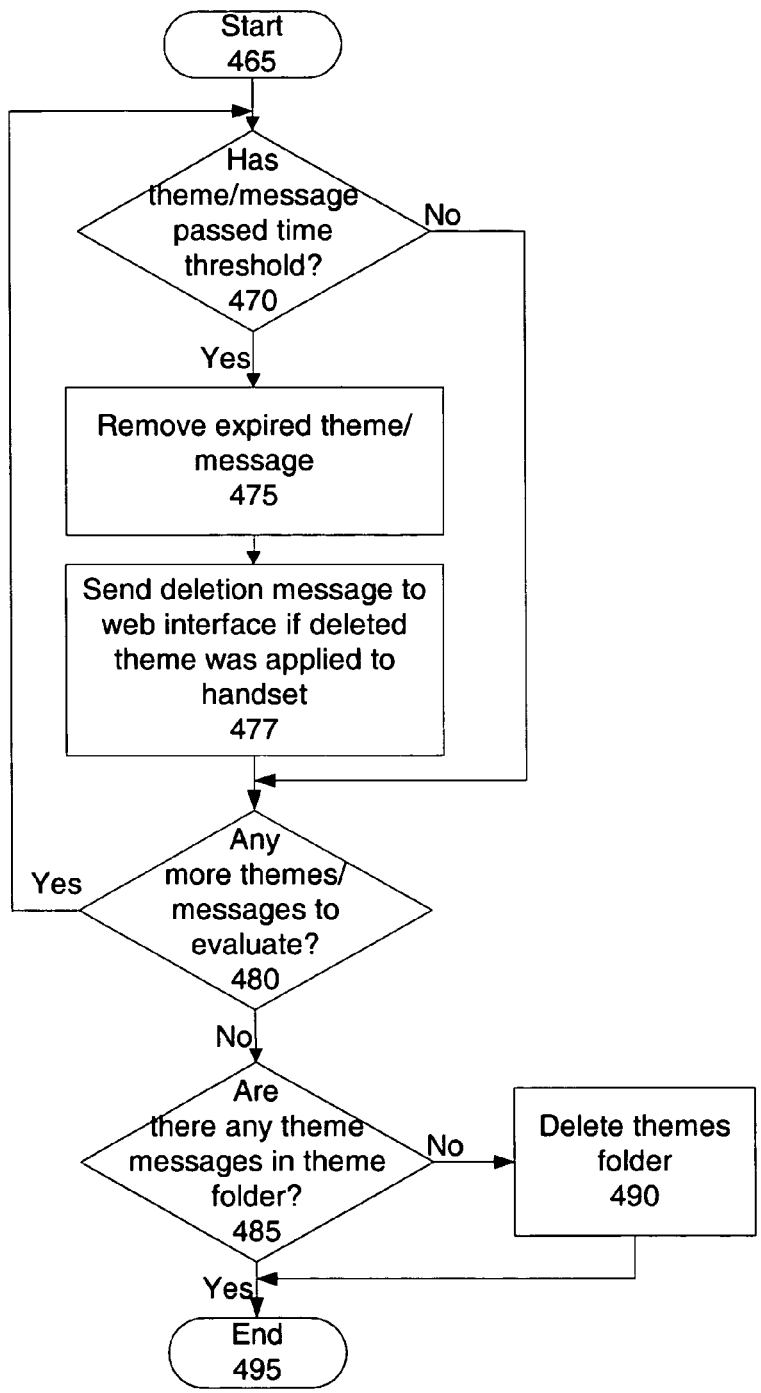
FIG. 4C is a flowchart of one embodiment of the expiration of themes and messages.

FIG. 4C is a flowchart of one embodiment of the expiry logic. The process starts at block 465.

At block 470, the process determines whether a themes and/or MMs containing themes have passed a specified age threshold. In one embodiment, an expiration time stamp is encapsulated in the MM created in block 425 described above.

If a theme or message has passed its age threshold, at block 475, the theme or message is deleted. When a theme is deleted, the user's handset is reset to the factory default setting, in one embodiment. In one embodiment, themes that have been applied to an associated web page are removed concurrently via messaging from the handset to the associated web server. In one embodiment, a plesio-synchronous method is used whereby the web server runs its own expiration logic, using its own clock, so there is no reliance on messaging between the device and web server to synchronously co-ordinate the expiration of themes, MMs containing themes, or theme folders. In an alternative embodiment, at block 477, the system sends a message to expire the theme from the associated web page.

The process then determines, at block 480, whether any more themes/messages need to be evaluated. If so, the process returns to block 470. If all themes have been evaluated, the process continues to block 485.

At block 485, the process determines whether there are any MMs containing themes in the themes folder. In one embodiment, auto-generated theme folders that have had all theme content removed are automatically removed by the theme client. If the themes folder(s) are empty, they are deleted at block 490. The process then ends, at block 495.

Figure 5A:
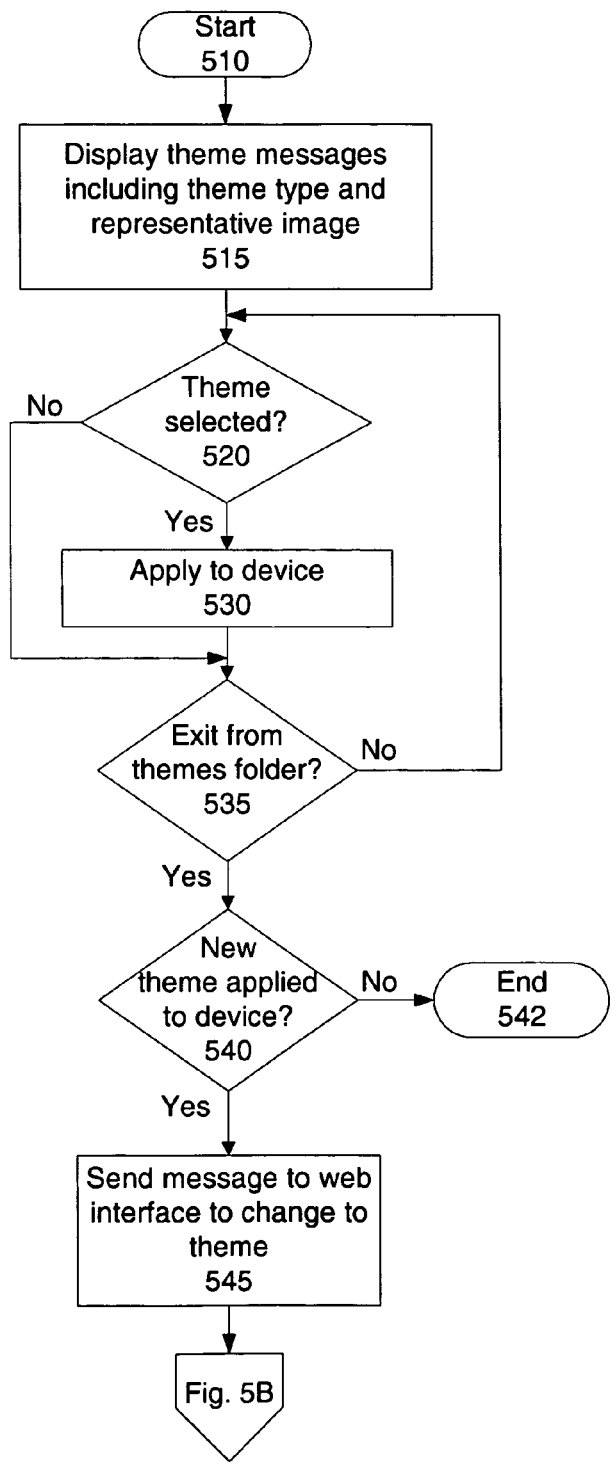
FIGS. 5A-B are a flowchart of one embodiment of downloading the theme, and adding it to the handset.
Figure 5B:
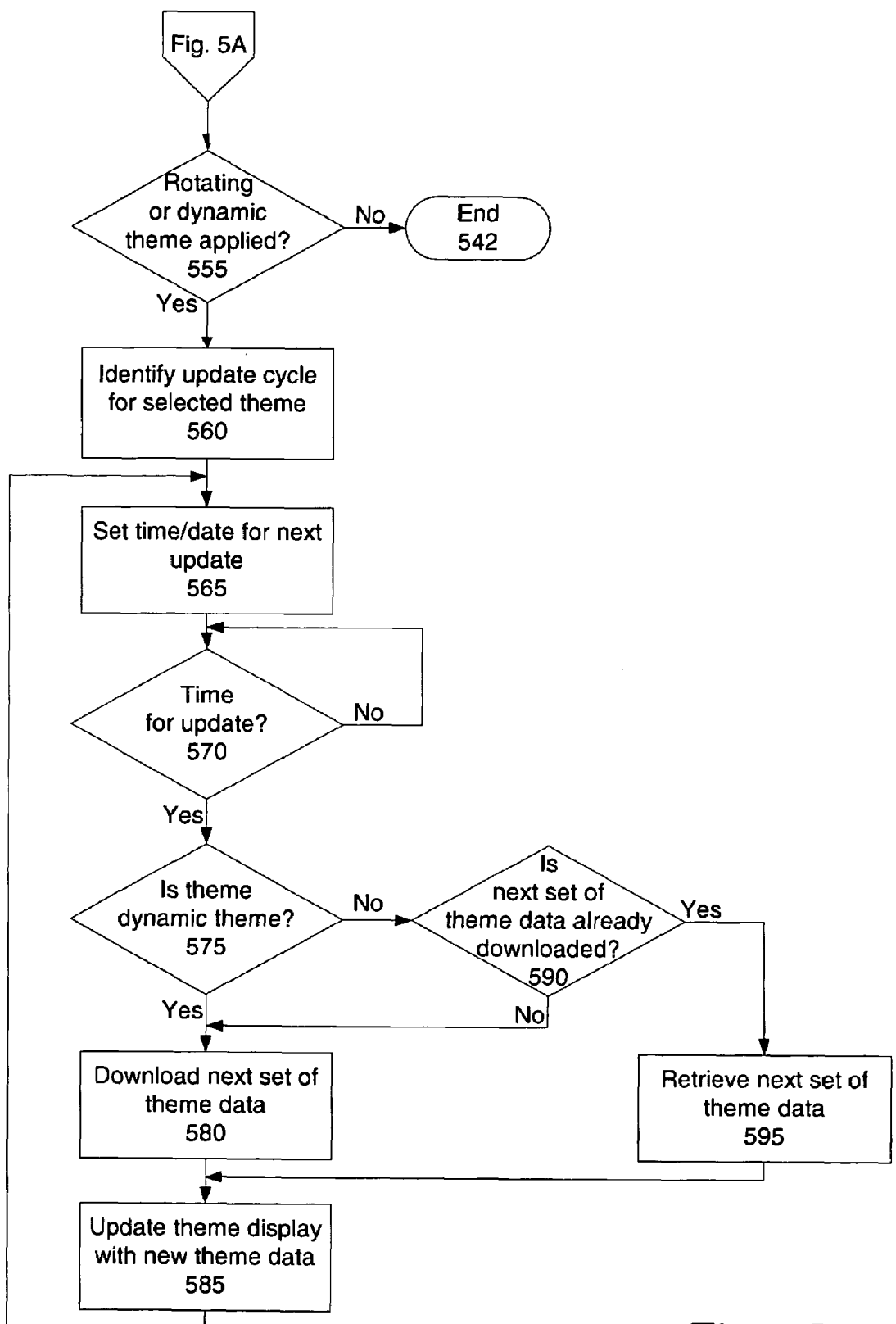

FIGS. 5A-B are a flowchart of one embodiment of selecting and applying a theme. The process starts at block 510. The process starts when the user selects the theme folder from the inbox. An exemplary user interface, showing the inbox including the various folders is shown in FIG. 6A.

At block 515, the theme messages in the theme folder are displayed for the user. FIG. 6B illustrates an exemplary user interface showing a number of themes in the theme folder. As can be seen, in one embodiment, the themes include a theme label/title, as well as a representational image. In one embodiment, the comment below the title identifies the theme type. In one embodiment, the expiry date is also included in the visible header.

At block 520, the process determines whether a theme has been selected. If no theme is selected, the process continues to block 535, to determine whether the user has exited from the theme folder. If the user exists from the theme folder, the process continues to block 540, otherwise, the process returns to block 520. In one embodiment, the process times out if there has not been an action in a preset period of time, and automatically exits the theme folder. If the user selects a theme to apply to the device, the process continues to block 530.

Figure 6C:
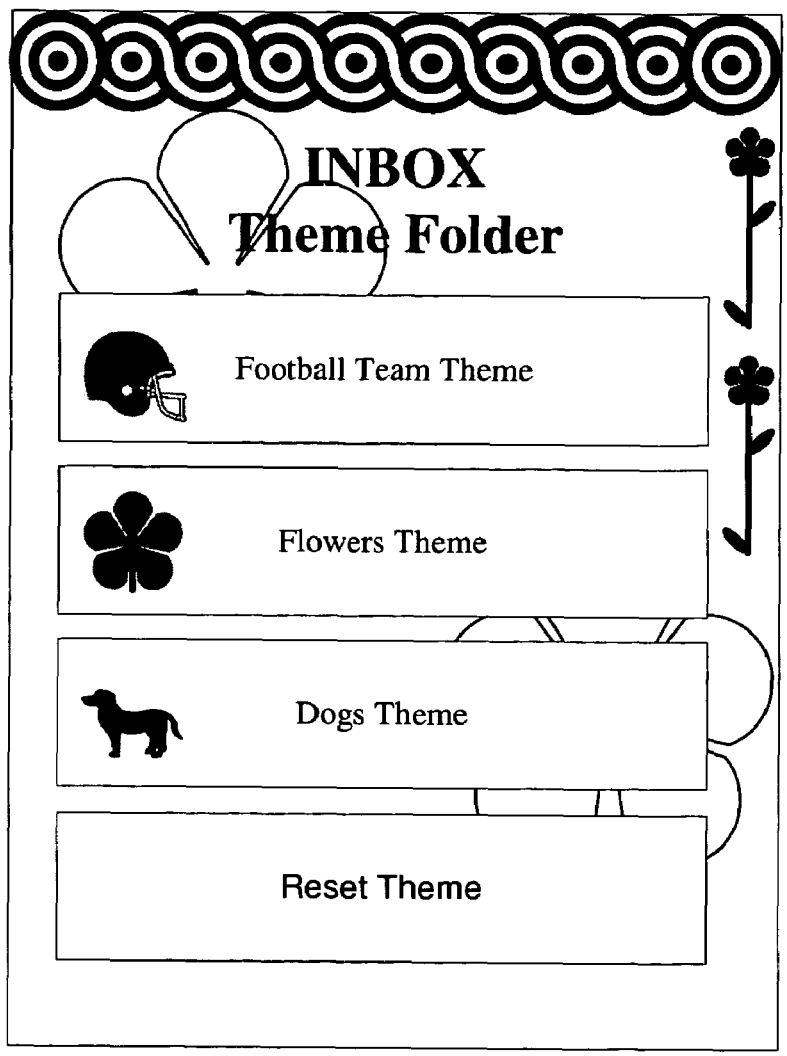

At block 530, the theme is applied to the device. FIG. 6C illustrates an exemplary user interface, showing certain theme elements having been applied.

At block 535, the process determines whether the user has left the theme folder, or otherwise indicated that he wishes to apply the theme, rather than continue browsing themes. The user can try various themes in the theme folder. In one embodiment, the system does not notify the web interface until the user exits the theme folder or otherwise indicates that he or she wishes to keep the theme applied, indicating that the currently applied theme will not be changed. Note that as can be seen in FIG. 6B, one of the "themes" is Reset to Default, i.e. remove currently applied theme. Thus, the user can exit the themes folder having applied no themes. In another embodiment, there may be a "reset to previous" option, which enables the user to remove the currently applied theme, and revert to the previously applied setting. In another embodiment, there is an "accept theme" option, which indicates that the theme should remain applied.

If the user does not exit from the themes folder/accept the theme, the process returns to block 520, to monitor for themes selected.

At block 540, the process determines whether a new theme was applied to the device. If no new theme was applied, the process ends at block 542.

If a new theme was applied, the process, at block 545, sends a message to the web interface to implement its corresponding theme. The process then continues to block 555.

At block 555, the process determines whether the theme applied is a changing theme. Changing themes are non-static, and are periodically updated. For example, changing themes may be rotating (the same pictures being swapped in and out periodically), dynamic (pictures are updated), or changing in some other manner. If the theme is not changing, the process ends, at block 542. If the theme is a changing theme, the process continues to block 560.

At block 560, the update cycle of the theme is identified. In one embodiment, the theme has an associated update cycle. In one embodiment, the update cycle is set to a default value of the theme does not identify an update cycle time.

At block 565, the time/date for the next update is set. In one embodiment, the updating logic sets an alarm clock-like functionality, to alert when an update is due. In another embodiment, the time/date may be set as a count-down cycle. Note that although the term "time/date" is used, themes may be updated as frequently as every few minutes, or as infrequently as once a year, or on an irregular schedule, such as "whenever a new album is released by the band."

In an alternative embodiment, the theme server or central theme managing authority tracks the theme that resides on the user's device. Whenever a triggering event occurs (for example the theme-associated data is updated), a trigger message indicating that it is "time for an update" is sent to each user's handset. Alternatively, the theme server automatically creates an "update MM" and sends the update MM to the user's system. The update MM is used to update the data associated with the theme message in the user's theme folder. In one embodiment, the update MM replaces the previous theme message (causing that message to be deleted).

At block 570, the process determines whether it is time for an update. As noted above, this may be based on an alarm, an external trigger message, or any other indication that the changing theme should be updated. When it is time to update, the process continues to block 575.

At block 575, the process determines whether the theme is a dynamic theme. In dynamic themes, the new data is not locally available. If the theme is dynamic, the process at block 580 downloads the new theme data. In one embodiment, the process receives a new MM, with the new theme data.

At block 585, the theme display is updated with the new data. Although this is illustrated as a flow, one of skill in the art would understand that these are disjoint processes. The downloading of the new theme data may take some time. Thus, the theme client is triggered when the system has successfully downloaded the new theme data. Also, while the term "download" is used, new theme data may be sent using an MM messaging format, may be downloaded using WAP, or may be obtained using any other available route.

Once the new data is successfully downloaded and installed, the process returns to block 565, to set the updated time/date for the next update cycle. In the alternative embodiment described, the system sends a message to the central tracker, indicating the time & date of the latest update.

If, at block 575 it was determined that the theme is not a dynamic theme, the process continues to block 590. At block 590, the process determines whether the next set of theme data has already been downloaded. In one embodiment, the rotating theme reuses data, for example cycling between seven pictures, one per day. The pictures may be previously downloaded theme data or new data. If the theme data has not yet been downloaded, the process continues to block 580, to download the next set of theme data. If the theme data has already been downloaded, the process continues to block 595. At block 595, the next set of theme data is retrieved. The process then continues to block 585, to update the theme display with the retrieved theme data.

In this way, themes can be applied to the user's system, and maintained.

Figure 7:
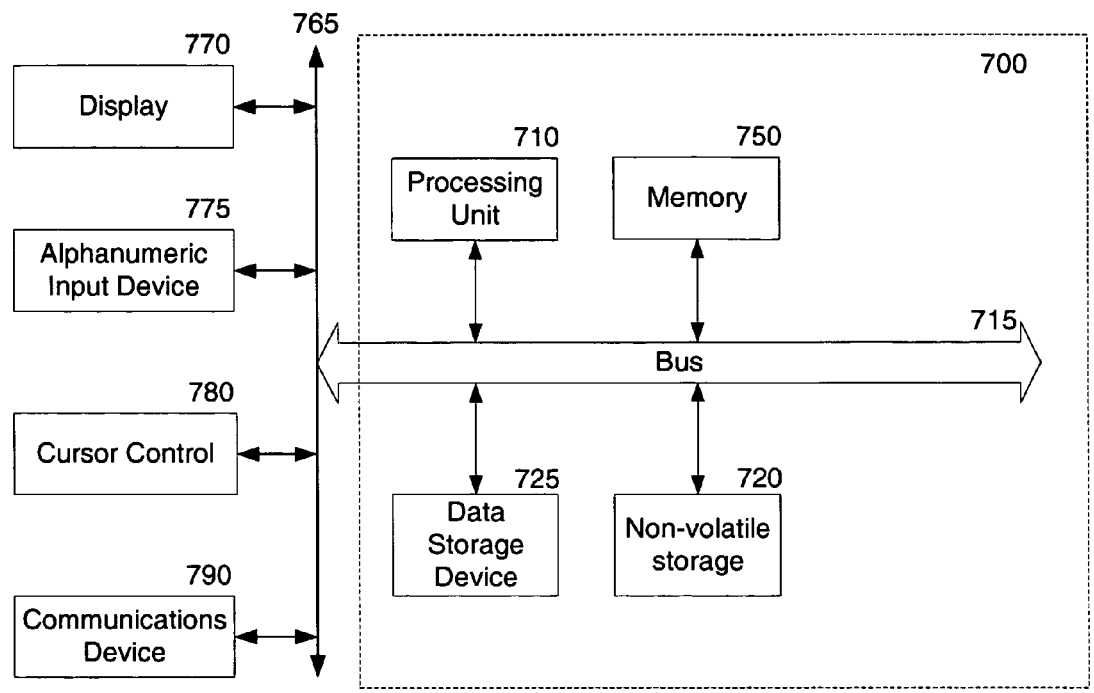
FIG. 7 is a block diagram of one embodiment of a computer system which may be used with the present invention.

FIG. 7 is one embodiment of a computer system that may be used with the present invention. It will be apparent to those of ordinary skill in the art, however that other alternative systems of various system architectures may also be used.

The data processing system illustrated in FIG. 7 includes a bus or other internal communication means 715 for communicating information, and a processor 710 coupled to the bus 715 for processing information. The system further comprises a random access memory (RAM) or other volatile storage device 750 (referred to as memory), coupled to bus 715 for storing information and instructions to be executed by processor 710. Main memory 750 also may be used for storing temporary variables or other intermediate information during execution of instructions by processor 710. The system also comprises a read only memory (ROM) and/or static storage device 720 coupled to bus 715 for storing static information and instructions for processor 710, and a data storage device 725 such as a magnetic disk or optical disk and its corresponding disk drive. Data storage device 725 is coupled to bus 715 for storing information and instructions.

The system may further be coupled to a display device 770, such as a cathode ray tube (CRT) or a liquid crystal display (LCD) coupled to bus 715 through bus 765 for displaying information to a computer user. An alphanumeric input device 775, including alphanumeric and other keys, may also be coupled to bus 715 through bus 765 for communicating information and command selections to processor 710. An additional user input device is cursor control device 780, such as a mouse, a trackball, stylus, or cursor direction keys coupled to bus 715 through bus 765 for communicating direction information and command selections to processor 710, and for controlling cursor movement on display device 770.

Another device, which may optionally be coupled to computer system 700, is a communication device 790 for accessing other nodes of a distributed system via a network. The communication device 790 may include any of a number of commercially available networking peripheral devices such as those used for coupling to an Ethernet, token ring, Internet, or wide area network. The communication device 790 may further be a null-modem connection, a wireless connection mechanism, or any other mechanism that provides connectivity between the computer system 700 and the outside world. Note that any or all of the components of this system illustrated in FIG. 7 and associated hardware may be used in various embodiments of the present invention.

It will be appreciated by those of ordinary skill in the art that any configuration of the system may be used for various purposes according to the particular implementation. The control logic or software implementing the present invention can be stored in main memory 750, mass storage device 725, or other storage medium locally or remotely accessible to processor 710.

It will be apparent to those of ordinary skill in the art that the system, method, and process described herein can be implemented as software stored in main memory 750 or read only memory 720 and executed by processor 710. This control logic or software may also be resident on an article of manufacture comprising a computer readable medium having computer readable program code embodied therein and being readable by the mass storage device 725 and for causing the processor 710 to operate in accordance with the methods and teachings herein.

The present invention may also be embodied in a handheld or portable device containing a subset of the computer hardware components described above. For example, the handheld device may be configured to contain only the bus 715, the processor 710, and memory 750 and/or 725. The present invention may also be embodied in a special purpose appliance including a subset of the computer hardware components described above. For example, the appliance may include a processor 710, a data storage device 725, a bus 715, and memory 750, and only rudimentary communications mechanisms, such as a small touch-screen that permits the user to communicate in a basic manner with the device. In general, the more special-purpose the device is, the fewer of the elements need be present for the device to function. In some devices, communications with the user may be through a touch-based screen, or similar mechanism.

It will be appreciated by those of ordinary skill in the art that any configuration of the system may be used for various purposes according to the particular implementation. The control logic or software implementing the present invention can be stored on any machine-readable medium locally or remotely accessible to processor 710. A machine-readable medium includes any mechanism for storing or transmitting information in a form readable by a machine (e.g. a computer). For example, a machine readable medium includes read-only memory (ROM), random access memory (RAM), magnetic disk storage media, optical storage media, flash memory devices, electrical, optical, acoustical or other forms of propagated signals (e.g. carrier waves, infrared signals, digital signals, etc.).

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method comprising:
   receiving a multimedia message (MM) from a mobile message service center (MMSC) at a handheld user device, the MM including a theme packaged into the MM by a themes server;
   identifying the MM message as a theme MM;
   automatically filing the MM in a theme folder in a user's inbox for MM messages received at the handheld user device in response to the identifying;
   enabling a user of the handheld user device to browse themes as multimedia messages in the theme folder of the user's inbox; and
   in response to user selection of a theme MM, applying the theme to the user's device, and
   sending a message to a web interface associated with the user of the handheld device, to cause the web interface to apply a corresponding theme.

2. The method of claim 1, further comprising:
   determining whether a theme folder is present on the handheld user device;
   creating a theme folder in the user's inbox when a theme folder is not already determined to be present on the handheld user device; and
   automatically filing the MM in the created theme folder.

3. The method of claim 1, further comprising:
   permitting the user to browse the MM messages in the theme folder using the same user interface mechanism as for regular MM messages.

4. The method of claim 3, wherein each MM message includes a representative theme image, to enable the user to visually identify the theme associated with the MM message.

5. The method of claim 4, further comprising:
   identifying a representative image for the theme MM, and adding the representative image to the visible message header.

6. The method of claim 1, further comprising:
   determining the theme type, wherein the theme type includes a static theme, a rotating theme, and a dynamic theme; and
   in a visible message header associated with the theme message, indicating the theme type.

7. The method of claim 1, further comprising:
   removing a theme message after it expires.

8. The method of claim 7, further comprising:
   deleting the theme folder when there are no theme messages in the theme folder.

9. A handheld device, the handheld device comprising:
   a processor;
   a memory;
   an inbox for receiving multimedia messages, that include themes packaged into the multimedia messages by a themes server, the inbox including a theme folder for theme messages;
   a filing logic to automatically file theme messages received as multimedia messages by the handheld device in the theme folder in response to identification of received multimedia messages as theme messages;
   a browsing logic to enable a user of the handheld device to browse themes as multimedia messages in the theme folder of the inbox of the handheld device;
   a receiving logic to receive a theme packaged into a multimedia message by the themes server;
   a theme client to install the theme onto the handheld device; and
   a messaging logic to send a message to a web interface associated with a user of the handheld device to trigger the web interface to add a corresponding theme to the web interface that corresponds to the theme installed onto the handheld device.

10. The handheld device of claim 9, wherein the theme client installs the theme in response to user selection of a theme MM.

11. The handheld device of claim 9, wherein the filing logic is further to create the theme folder within the inbox when no theme folder is present.

12. The handheld device of claim 9, further comprising:
   a multimedia packaging logic to identify a representative image for the theme MM, and adding the representative image to the visible message header to enable the user to visually identify the theme associated with the MM message.

13. The handheld device of claim 12, further comprising:
   the multimedia packaging logic further to determine a theme type, wherein the theme type includes a static theme, a rotating theme, and a dynamic theme, and to indicate in the visible message header associated with the theme message the theme type.

* * * * *